(12) United States Patent
Jaerger et al.

(10) Patent No.: US 11,945,137 B2
(45) Date of Patent: Apr. 2, 2024

(54) POWDER APPLICATION DEVICE FOR PRODUCING STIFFENING ELEMENTS FROM PULVEROUS MATERIAL

(71) Applicant: RHENOFLEX GMBH, Ludwigshafen (DE)

(72) Inventors: Henritte Jaerger, Heuchelheim bei Frankenthal (DE); Sebastian Ames, Mannheim (DE); Slavica Milkovic, Tay Ninh Province (VN)

(73) Assignee: RHENOFLEX GMBH, Ludwigshafen (DE)

(*) Notice: Subject to any disclaimer, the term of this patent is extended or adjusted under 35 U.S.C. 154(b) by 208 days.

(21) Appl. No.: 17/311,867

(22) PCT Filed: Dec. 4, 2019

(86) PCT No.: PCT/EP2019/083606
§ 371 (c)(1),
(2) Date: Jun. 8, 2021

(87) PCT Pub. No.: WO2020/120243
PCT Pub. Date: Jun. 18, 2020

(65) Prior Publication Data
US 2021/0331357 A1  Oct. 28, 2021

(30) Foreign Application Priority Data
Dec. 11, 2018 (DE) .............. 102018221393

(51) Int. Cl.
*B29C 31/02* (2006.01)
*A43B 23/08* (2006.01)
(Continued)

(52) U.S. Cl.
CPC ............ *B29C 31/02* (2013.01); *A43B 23/086* (2013.01); *A43B 23/16* (2013.01); *B29C 43/006* (2013.01);
(Continued)

(58) Field of Classification Search
CPC ........................................ B29C 67/08
See application file for complete search history.

(56) References Cited

U.S. PATENT DOCUMENTS

| 1,788,389 A | 1/1931 | Garret |
| 2,217,171 A | 10/1940 | Kumnick et al. |

(Continued)

FOREIGN PATENT DOCUMENTS

| CN | 201907156 U | 7/2011 |
| CN | 103298594 A | 9/2013 |

(Continued)

OTHER PUBLICATIONS

International Search Report dated Mar. 4, 2020 for PCT application No. PCT/EP2019/083606.

(Continued)

*Primary Examiner* — Benjamin A Schiffman
(74) *Attorney, Agent, or Firm* — Ohlandt, Greeley and Perle, LLP (57) ABSTRACT

A powder application apparatus for an at least partially meltable powder to be applied onto a feeding element for producing reinforcing elements comprises a powder container. In the area of an outlet of the powder container a template for defining a basic shape of a reinforcing element to be produced is provided. Further, a closing device for opening and closing the outlet is provided. For producing reinforcing elements having different stiffness, barrier elements in particular connected with the template are provided. The barrier elements reduce the powder supply to the (Continued)

feeding element such that a reinforcing element with areas of different material thickness are created. A method for producing such a reinforcing element.

14 Claims, 6 Drawing Sheets

(51) Int. Cl.
    *A43B 23/16*     (2006.01)
    *B29C 43/00*     (2006.01)
    *B29C 43/34*     (2006.01)
    *B29C 67/08*     (2006.01)
    *B29C 64/205*     (2017.01)
    *B29C 64/255*     (2017.01)
    *B29L 31/50*     (2006.01)

(52) U.S. Cl.
    CPC .............. *B29C 43/34* (2013.01); *B29C 67/08* (2013.01); *B29C 2043/3416* (2013.01); *B29C 2043/3427* (2013.01); *B29C 64/205* (2017.08); *B29C 64/255* (2017.08); *B29L 2031/50* (2013.01)

(56) References Cited

U.S. PATENT DOCUMENTS

| | | | | |
|---|---|---|---|---|
| 3,852,840 A | * | 12/1974 | Newton | B29C 67/08 427/197 |
| 4,076,567 A | | 2/1978 | Yoshikawa et al. | |
| 4,181,313 A | * | 1/1980 | Hillier | F16J 15/104 277/638 |
| 4,592,798 A | * | 6/1986 | Simmonds, Jr. | B29C 67/08 12/146 D |
| 4,793,882 A | * | 12/1988 | Brehmer | B29C 43/18 12/146 D |
| 5,095,961 A | | 3/1992 | Nakagawa | |
| 9,272,447 B2 | | 3/2016 | Wilding et al. | |
| 2015/0056316 A1 | | 2/2015 | Kim et al. | |
| 2015/0104346 A1 | | 4/2015 | Nakamura et al. | |
| 2015/0239004 A1 | | 8/2015 | Mehrab et al. | |
| 2015/0360289 A1 | | 12/2015 | Liou et al. | |
| 2017/0283596 A1 | | 10/2017 | Saito | |
| 2019/0009447 A1 | | 1/2019 | Nicolai et al. | |
| 2021/0354340 A1 | * | 11/2021 | Katzenberger | B29C 43/52 |

FOREIGN PATENT DOCUMENTS

| | | |
|---|---|---|
| CN | 10421164 A | 12/2014 |
| CN | 104550900 A | 4/2015 |
| CN | 104736257 A | 6/2015 |
| CN | 105268970 A | 1/2016 |
| CN | 205735658 U | 11/2016 |
| CN | 108602217 A | 9/2018 |
| EP | 3175930 A1 | 6/2017 |
| TW | 201817499 A | 5/2018 |
| WO | 2012059367 A1 | 5/2012 |

OTHER PUBLICATIONS

Indian Office Action dated Aug. 2, 2022 for Indian Patent Appl. No. 202147021928.

Taiwan Office Action (with partial English translation) dated Dec. 28, 2023 for Taiwan Appl. No. 108144733.

* cited by examiner

POWDER APPLICATION DEVICE FOR PRODUCING STIFFENING ELEMENTS FROM PULVEROUS MATERIAL

BACKGROUND

1. Field of the Disclosure

The disclosure relates to a powder application apparatus for an at least partially meltable powder or powdery material to be applied onto a feeding element for producing reinforcing elements. The reinforcing elements are in particular reinforcing elements for shoes, bags, orthopedic applications and the like. Further, the disclosure relates to a method for producing such reinforcing elements from an at least partially meltable powder.

2. Discussion of the Background Art

Such reinforcing elements can be produced using an apparatus as described in WO 2012/059367. The production is carried out such that a freely flowing, at least partially meltable powder is stored in a powder container and a template is provided at the outlet of the powder container. Through the template adapted to be closed by a slider, the powder freely flows onto a conveyor belt. The provision of the template allows the powder to be applied in the desired basic shape or nearly the desired final shape. Subsequently, pressure and/or heat are supplied such that the powder is compounded and corresponding reinforcing elements are produced.

In particular in the case of reinforcing elements for shoes and in particular with regard to protecting the toes by a front cap or in the area of the heel by a rear cap, it is desired that such reinforcing elements comprise differently reinforced areas.

It is an object of the disclosure to provide a suitable powder application apparatus as well as a corresponding method for producing reinforcing elements having differently reinforced areas.

SUMMARY

The powder application apparatus according to the disclosure for an at least partially meltable powder or powdery material serves for applying the corresponding material onto a feeding element for producing reinforcing elements, in particular for shoes, bags, orthopedic applications or the like. The feeding element can be a conveyor belt, a stationary plane element, such as a receiving metal plate or the like. The powder application apparatus comprises a powder container for storing the at least partially meltable powder. At an outlet of the powder container a template is provided. The latter serves for defining a basic or final shape of a reinforcing element to be produced. According to a preferred embodiment, the powder can freely flow out of the outlet by gravity. However, conveyor elements, such as transport belts, transport elements, an air flow or the like, for example, can also be used. The powder travels through the template onto the feeding element. Further, a closing means for opening and closing the outlet of the powder container is provided. Here, the closing means can be arranged upstream or downstream of the template as seen in the conveying or transport direction of the powder. In particular, the closing means is configured as a slider.

It is preferred that during application of the powder onto the feeding element there is no relative movement between the feeding element and the outlet of the powder container and the template, respectively. In the case of a feeding element configured as a transport belt this can be realized in that the feeding element stands still during the powder application and/or the powder application apparatus or at least the template or the outlet of the powder container move at the same velocity as the feeding element configured as a transport belt, for example. After applying or depositing the powder onto the feeding element configured as a belt or a stationary element, the at least partially meltable powder can be compounded in the next step by supplying pressure and/or heat, and the corresponding reinforcing element can be produced.

The powder application apparatus according to the disclosure comprises at least one barrier element for producing reinforcing elements having different material thickness or for forming areas having different stiffness. The barrier element reduces the powder supply to the feeding element in correspondingly defined areas. The at least one barrier element thus reduces the quantity of supplied powder in predetermined areas. Thereby, reinforcing elements having areas of different material thickness can be created, wherein in the areas where the barrier elements are disposed a smaller material thickness is achieved. The thickness of these areas is preferably 0.2 to 3 mm, in particular 0.3 to 2.5 mm and particularly preferably 0.35 to 2.25 mm. These are areas of a lower stiffness. The reinforcing element produced according to the disclosure is preferably made from a single material of different thickness and is in particular formed in one piece.

As barrier elements baffle plates, grids, pins, webs or the like can be provided. They may be arranged upstream of the template, as seen in the conveying direction of the powder, and/or in the template plane.

It is particularly preferred that the barrier elements are connected with the template, preferably be integrally formed with the latter. This offers the advantage that for producing different reinforcing elements, the template can easily be exchanged together with the respective barrier elements. Here, it is preferred that webs as the barrier elements are connected with the template.

In particular, it is preferred that for creating an area of a small material thickness, a plurality of barrier elements, in particular a plurality of webs, are provided. In the case of barrier elements configured as webs or pins, for example, it is further preferred that they essentially extend in parallel to each other and/or are configured in a grid-like pattern. For example, it is possible to provide corresponding barrier elements, such as webs, at the edge of the template such that reinforcing elements having areas of smaller material thickness or smaller stiffness in the edge area can be produced. The corresponding edge area is preferably configured in a partially, in particular completely circumferential manner.

It is particularly preferred that the powder is applied such that on the feeding element and the transport belt even in the area of the at least one barrier element a preferably completely closed material layer is formed. Thus, due to providing the barrier elements, a smaller quantity of powder travels to the feeding element or freely flows onto the latter. Due to the grain size of the powder, a corresponding arrangement of the barrier elements and the like ensures that the powder flows together or trickles together such that areas having a smaller material thickness are created. This need not be continuously realized, rather it is also possible that areas are created where no powdery material is provided. It is however preferred that a completely closed material layer having different material thickness is formed.

A preferably completely closed material layer even in the area of the barrier elements can be realized by suitable selection of the flowability of the powder and/or the shape of the barrier element(s) and/or the distance between the template and the feeding element and/or a time period of the powder supply. For example, it is also possible to vibrate the template and/or the feeding element during the powder supply to ensure that the powder flows together or trickles together even in the areas cleared by the barrier elements.

For example, the shape of the barrier elements configured as webs or the like can be such that they taper in the direction in which the powder is conveyed or freely flows. In particular, the barrier elements may have a triangular cross-section. It is also possible that the barrier elements configured as webs or baffle plates, for example, are inclined such that the powder also freely flows into the area covered by the barrier elements but here forms a smaller material thickness. Webs which have a variable width as seen in top view, for example, may also be advantageous for creating a closed material layer. In particular, the webs may have different shapes, widths, distances etc. in different areas of the template for defining the material thickness or the quantity of supplied powder.

The distance between the template and the feeding element is preferably as small as possible and in particular ranges from 0.1 mm to 0.5 mm.

The flowability of the powder used preferably ranges from 20 to 30 seconds, measured with a 10 mm nozzle as per EN ISO 6186.

As a material for producing the reinforcing elements according to the disclosure, in particular a powdery thermoplastic material is suitable. This material can be produced by grinding a granulate, for example. A preferred powder size ranges from 50 μm to 900 μm, preferably 50 μm to 600 μm.

Further, the disclosure relates to a method for producing reinforcing elements, in particular for shoes, bags, orthopedic applications or the like. According to a particularly preferred embodiment, the method according to the disclosure is carried out with the powder application apparatus according to the disclosure described above, wherein the procedures described above on the basis of the powder application apparatus are preferred.

In the method according to the disclosure for producing reinforcing elements, a powder is applied onto a feeding element in the basic or final shape of the reinforcing element to be produced. Here, the powder is applied such that less powder is applied in certain areas such that areas of the reinforcing element having a smaller material thickness are created. Subsequently, the powder can be compounded by heat and/or pressure.

It is preferred that the powder is applied from a powder container via a template, which essentially has the outer dimensions of the basic or final shape, onto the feeding element. Here, the use of the barrier elements described above is preferred, which particularly preferably are connected with the template. According to a particularly preferred aspect of the disclosure, the powder is applied such that on the feeding element even in the area of the at least one barrier element a preferably completely closed material layer is formed. As described above on the basis of the powder application apparatus, this can preferably be ensured by a suitable flowability of the powder and/or the shape of the barrier element(s) and/or the distance between the template and the feeding element and/or the time period of the powder supply.

It is particularly preferred that a reinforcing element is produced which has a small material thickness and thus a smaller stiffness in an edge area. In particular, the edge area is configured in a completely circumferential manner.

In addition, the disclosure relates to a reinforcing element which is in particular suitable for shoes, bags, orthopedic applications or the like, wherein the reinforcing element comprises areas of different material thickness. Here, it is preferred that the reinforcing element is produced from one and the same material and the areas of different material thickness are not made from a multilayered material. The reinforcing element according to the disclosure is therefore preferably formed in one piece. In particular, the reinforcing element is produced by compounding an at least partially meltable powder which already has areas of different thickness prior to compounding the powder by pressure and/or heat.

It is particularly preferred that the reinforcing element is produced by means of the method described above, wherein it is additionally preferred that the powder application apparatus described above is used for this purpose.

The disclosure will be described hereafter in more detail with reference to preferred embodiments and the accompanying drawings.

DETAILED DESCRIPTION OF THE PREFERRED EMBODIMENT

Figure 1:
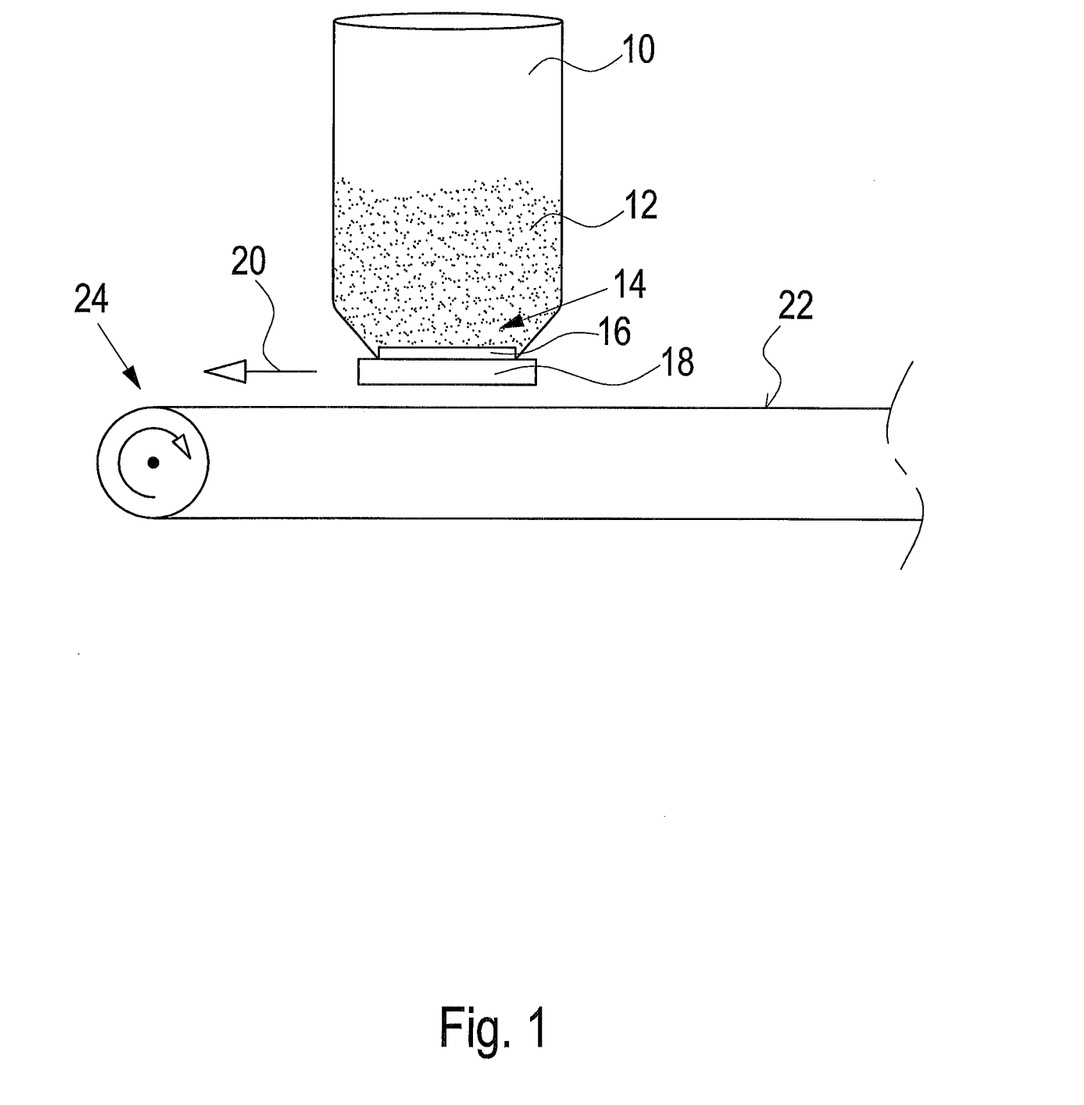
FIG. 1 shows a schematic side view of a powder application apparatus according to the disclosure.
Figure 2:
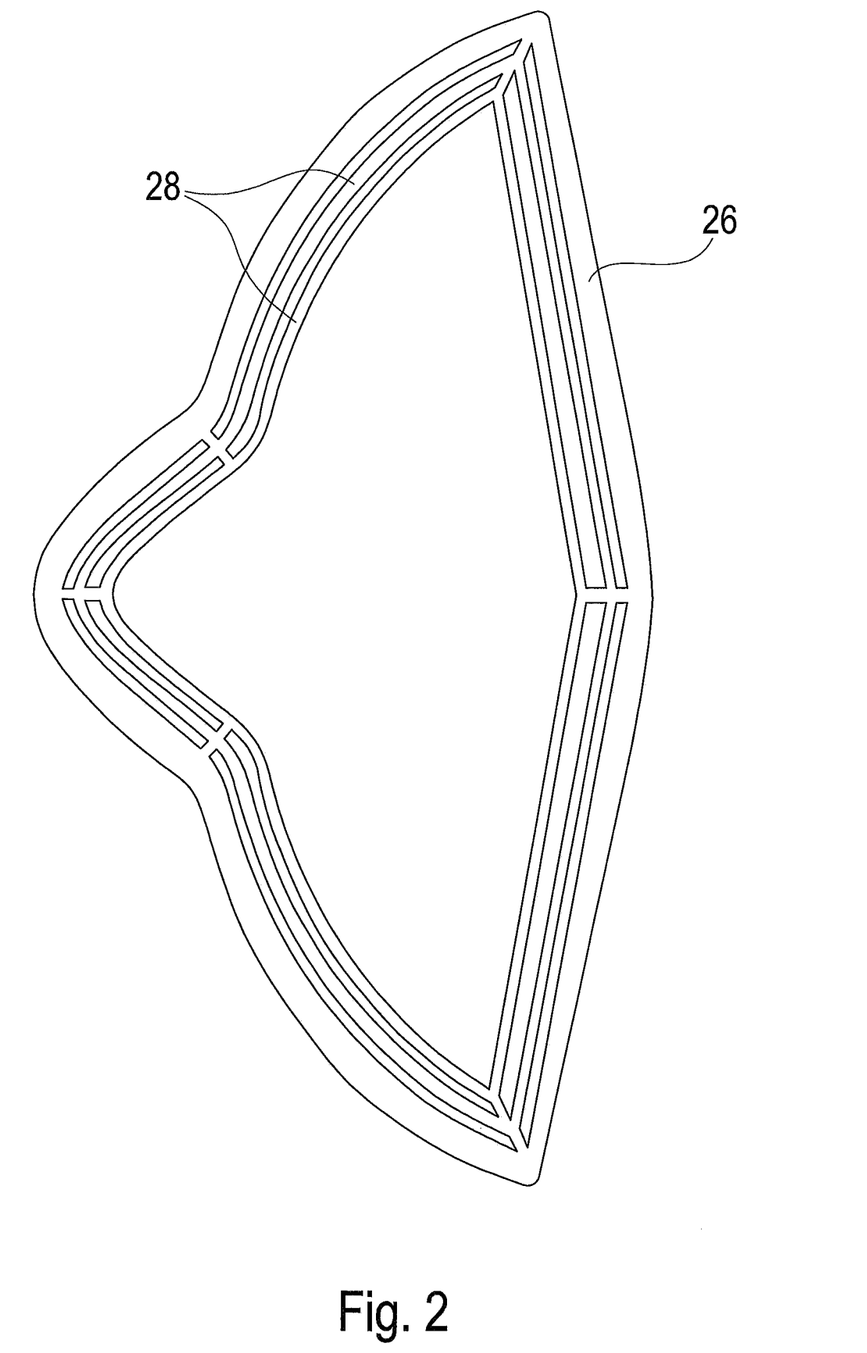
FIGS. 2-5 show schematic top views of different templates.
Figure 3:
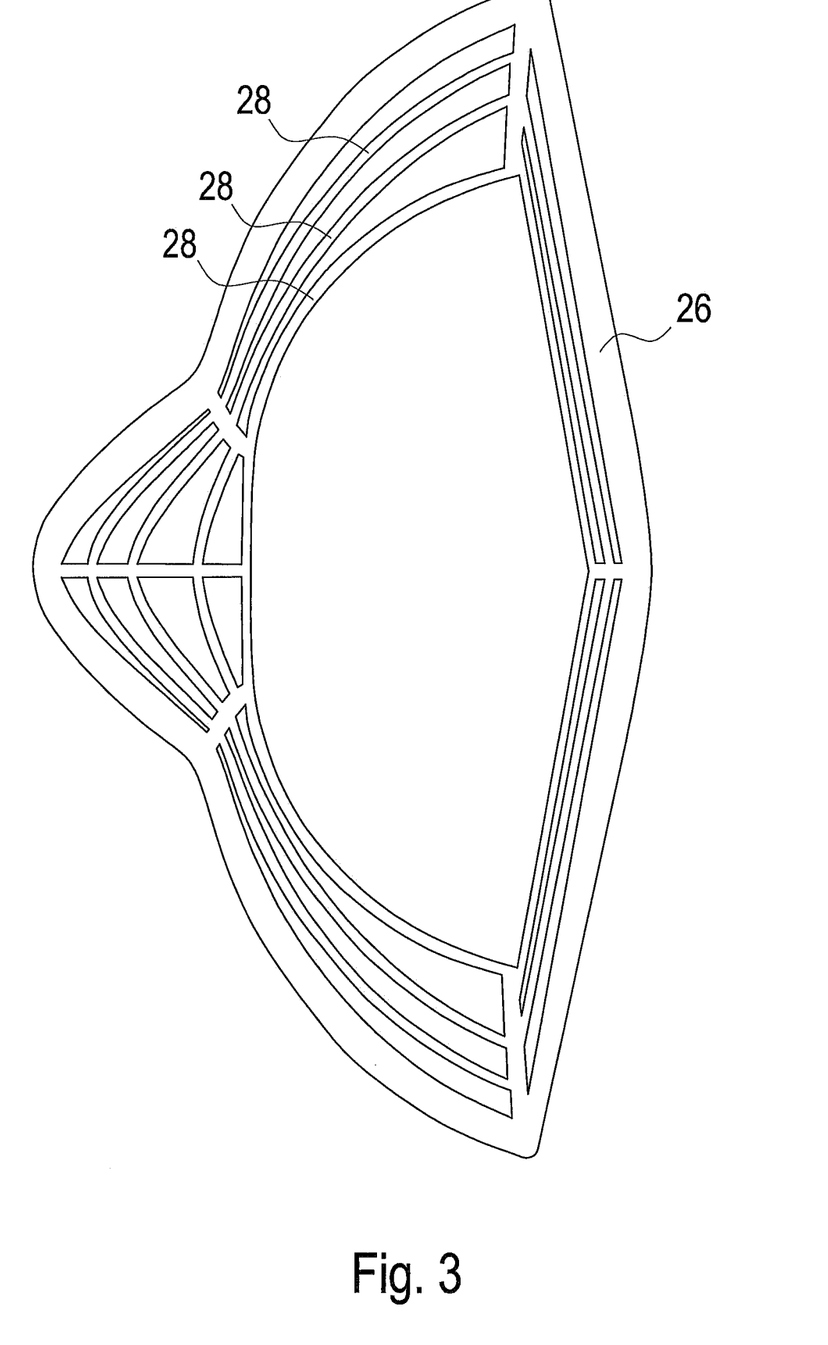
Figure 4:
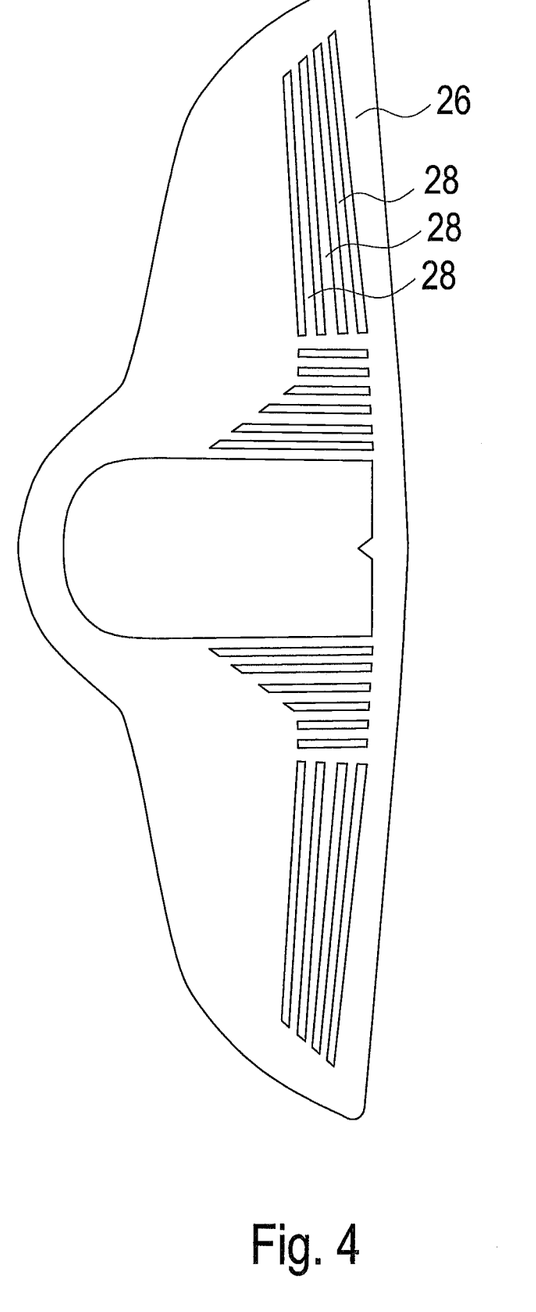
Figure 5:
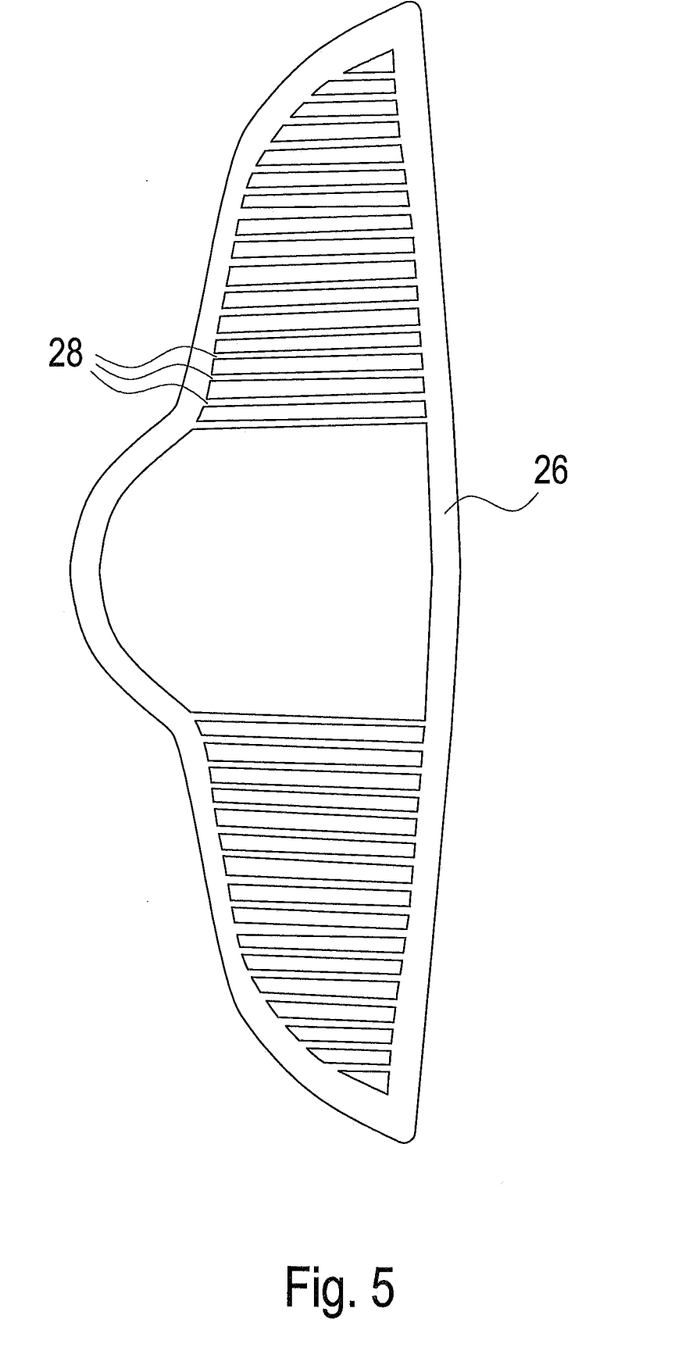

A powder application apparatus comprises a powder container 10 in which an at least partially meltable powder 12 is arranged. At an outlet 14 of the powder container 10 a template 16 is arranged. For opening and closing the outlet 14, a closing means configured as a slider 18 in the illustrated exemplary embodiment is provided. By opening the slider 18 in the direction indicated by an arrow 20, powder 12 freely flows by gravity through the template 16 onto an upper surface 22 of a feeding element 24 which is a conveyor belt in the illustrated exemplary embodiment.

To allow the powder 12 to be applied, nearly in the form of the basic or final shape of a reinforcing element to be produced, onto the upper surface 22 of the conveyor belt 24, the conveyor belt 24 is stopped with the slider 18 in the open state, for example.

In the different embodiments of the templates 14 illustrated in FIGS. 2-5, similar and identical components are designated by the same reference numerals.

The templates each comprise a circumferential edge element 26 which in particular serves for fastening to a corresponding fastening means in the outlet 14 of the powder container 10. The frame-shaped element 26 has connected thereto barrier elements 28 configured as webs.

In the area of the barrier elements 28, less powder 12 freely flows onto the upper surface 22 of the conveyor belt 24. Thereby, reinforcing elements having different material thickness are produced. For finishing the reinforcing element, the powder is compounded by application of pressure and/or heat.

Figure 6:
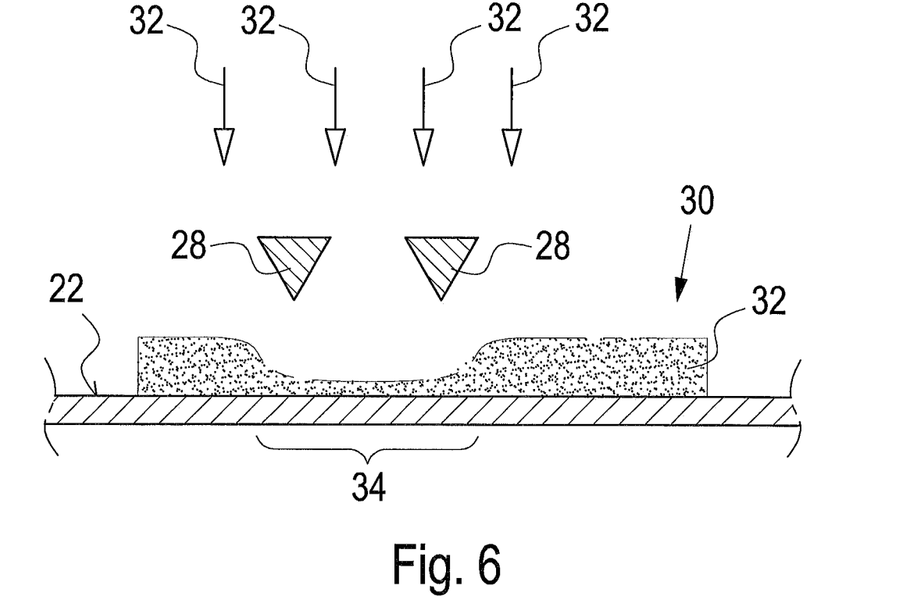
FIG. 6 shows a sectional view of webs of a template according to a preferred embodiment.

For ensuring a different powder material thickness in the areas of the barrier elements 28, but, on the other hand, applying a closed powder layer onto the upper surface 22 of the conveyor belt 24, the webs 28 can have a triangular cross-section, for example (FIG. 6). Thereby, for producing a reinforcing element 30, a powder material 12 is applied onto an upper surface 22 of the conveyor belt 24 such that in the free-flowing direction 32 an area 34 having a smaller material thickness is created below the barrier elements 28.

Figure 7:
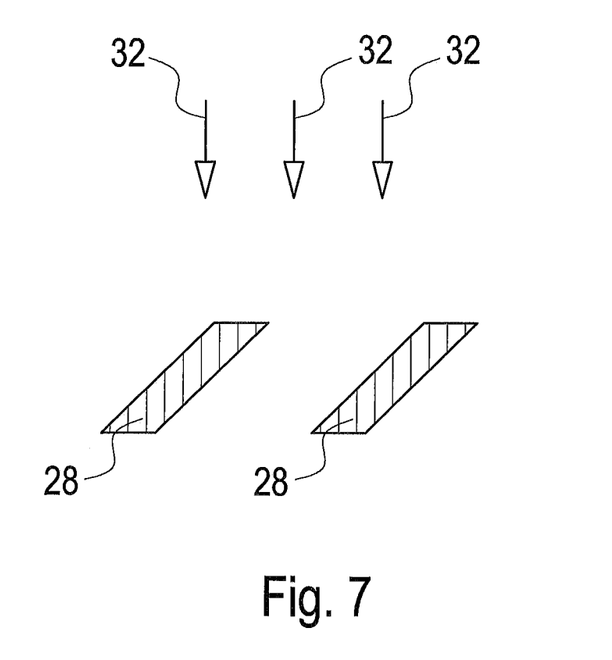
FIG. 7 shows a sectional view of webs of a template according to another preferred embodiment.

The barrier elements 28 configured as webs may also be inclined with respect to a free-flowing direction 32, for example, as illustrated in FIG. 7.

What is claimed is:

1. A powder application apparatus for an at least partially meltable powder to be applied onto a feeding element for producing reinforcing elements for shoes, bags, orthopedic applications or the like, comprising:
    a powder container;
    a template provided at an outlet of the powder container for defining a basic shape of a reinforcing element to be produced;
    a closing device that opens and closes the outlet; and
    at least one barrier element for reducing a powder supply to the feeding element for creating areas of the reinforcing element having a smaller material thickness, wherein the at least one barrier element is connected to the template.

2. The powder application apparatus according to claim 1, wherein the at least one barrier element comprises webs.

3. The powder application apparatus according to claim 1, wherein a plurality of barrier elements serve for creating an area of the reinforcing element having a smaller material thickness.

4. The powder application apparatus according to claim 1, wherein a plurality of webs extend in parallel to each other and/or are bent.

5. The powder application apparatus according to claim 1, wherein the area of a smaller material thickness is configured as an at least partially or completely circumferential edge area.

6. The powder application apparatus according to claim 1, wherein the powder is applied such that on the feeding element, even in the area of the at least one barrier element, a preferably completely closed material layer is formed.

7. The powder application apparatus according to claim 6, wherein the preferably completely closed material layer is realized by a flowability of the powder and/or a shape of the at least one barrier element and/or a distance between the template and an upper surface of the feeding element and/or a time period of the powder supply.

8. The powder application apparatus according to claim 1, wherein the at least one barrier element tapers in a conveying direction of the powder.

9. The powder application apparatus according to claim 1, wherein the at least one barrier element is inclined in a conveying direction of the powder.

10. The powder application apparatus according to claim 1, wherein the at least one barrier element has a variable width.

11. The powder application apparatus according to claim 10, wherein the variable width in is in a direction that is transverse to a conveying direction.

12. The powder application apparatus according to claim 1, wherein a distance between the template and an upper surface of the feeding element ranges between 0.1 mm and 0.5 mm.

13. The powder application apparatus according to claim 1, wherein a flowability of the powder is 20-30 seconds, measured with a 10 mm nozzle as per EN ISO 6186.

14. The powder application apparatus according to claim 1, wherein the feeding element comprises a conveyor belt.

* * * * *